INVENTORS
KENNETH W. BRITTAN
DAVID HAMPSON

United States Patent Office

3,491,438
Patented Jan. 27, 1970

3,491,438
METHOD OF MAKING ELECTRICALLY HEATED WINDOW GLAZINGS
Kenneth W. Brittan, Abington, and David Hampson, Birmingham, England, assignors to Triplex Safety Glass Company Limited, London, England, a corporation of Great Britain
Original application Jan. 16, 1967, Ser. No. 609,530. Divided and this application Dec. 6, 1967, Ser. No. 712,878
Int. Cl. H01c 7/00, 17/00
U.S. Cl. 29—611                          2 Claims

ABSTRACT OF THE DISCLOSURE

A method of making an electrically heated window glazing includes the steps of covering the surface of the glazing with a coating of electrically insulating material, covering said coating with a film of electrically conductive material, the thickness of the coating being at least about 30 times the thickness of the film, and then dividing the film into discrete adjacent areas by means of a heated rod, the tip of the rod penetrating through the film without materially penetrating the coating, the adjacent edges of said areas being separated by an amount not greater than about 0.01 inch.

---

Figure 1:
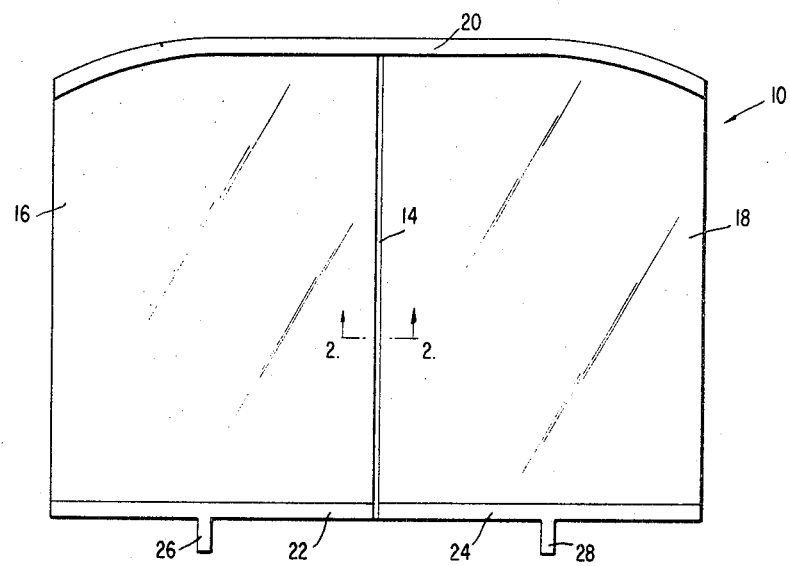

This application is a division of Ser. No. 609,530, filed Jan. 16, 1967, which is a continuation-in-part of application Ser. No. 283,824, filed May 28, 1963, now abandoned.

BRIEF SUMMARY OF THE INVENTION

This invention relates to transparent window glazings of a kind carrying a thin conducting film (of the order of 0.000,000,2″ thinness) and bus bars in electrical contact with opposite edges of the film, said film being formed on an electrically insulating coating adhering to the glazing, the coating being of a thinness of the order of 0.000,006″, the film and coating being intimately adherent the one to the other.

A window glazing of the kind above referred to may consist of a single sheet of glass, for example that type of glass known as plate glass or float glass or may consist of a laminated assembly comprising sheets of glass between which sheets are interposed bonding layers, and the transparent electro-conductive film is formed on either one or both faces of the glazing. The film may be a gold film or may be a film made of tin oxide and the film is used so as to constitute an electric heating medium. Experience has shown that it is frequently necessary, on account of the voltage supply available, the size or shape of the base, and the limits of resistance to which the film can be formed with the desired degree of transparency, to increase the resistance of the film by dividing the film into separate areas, which areas are then electrically connected together by the bus bars.

Bus bars of greater conductivity than the film are conventionally formed on the transparent glazing along two opposed edges of the filmed area. If the voltage is high in relation to the resistance of the film, a non-conductive barrier or barriers is inserted in the film running from one bus bar to the other and one or both bus bars may be divided into sections so that, for example, the separate filmed areas are arranged electrically in series.

Alternatively, one bus bar may be divided into three sections and the film provided with barriers so that it is divided into three physically separate areas which can be supplied via the divided bus bar from a three-phase supply, the opposite bus bar being unbroken and forming the star point of the circuit.

As a further alternative each bus bar may be divided into two unequal parts and the film divided by barriers into three areas supplied from the bus bars in Delta connection.

In any case, the barriers are lines or intervals of discontinuity in the conductive film and although various techniques have been used and proposed to provide these discontinuities, they have been plagued with a common problem when the films are used to heat transparent materials such as the windscreen or canopy of an aircraft, for example. This problem has to do with the fact that with prior art arrangements, the discontinuities in the conductive film have been readily discernible so that their presence causes an annoying and potentially dangerous distraction.

According to the present invention, the problem is overcome by an arrangement which produces a twofold effect resulting in lines of discontinuity which are barely perceptible. Specifically, the present invention embodies an electrically conductive film superimposed over a coating of electrically insulating material in which the coating is relatively thick as compared to the film. The discontinuities are formed by burning or melting through the very thin film to but not through the underlying coating. The presence of the underlying coating allows the interval to be very narrow and since such underlying coating is not completely penetrated its physical boundaries are not sharply delineated. These two factors in combination serve to produce the above noted effect, that the intervals are barely discernible and constitute a negligible source of distraction under the conditions set forth.

It is a primary object of this invention to provide an improved electro-conductive film which is divided into separate areas by minute intervals of high resistivity which intervals are not readily apparent to the eye of an observer.

Accordingly the present invention provides a transparent window glazing carrying a transparent thin conducting film (of the order of 0.000,000,2″ thinness) and bus bars in electrical contact with opposite edges of the film, said film being formed on an electrically insulating coating adhering to the glazing, the coating being of a thinness of the order of 0.000,006″, the film and coating being intimately adherent the one to the other, characterized in that the film is divided into electrically separate but adjacent areas in electrical connection with the bus bars by ruling an interval extending between the bus bars through the film to the coating, and constituted by the adjacent film edges exposed at the interval and the coating material below them, the film edges at the interval being less than 1/100 of an inch apart, said interval constituting an electrical insulation between the adjacent film areas and being substantially invisible when observed in the light passing through the glazing.

More particularly, the present invention comprises a transparent window glazing carrying a transparent thin conducting film (of the order of 0.000,000,2″ thinness) and bus bars in electrical contact with opposite edges of the film, said film being formed on an electrically insulating coating adhering to the glazing, the coating being of a thinness of the order of 0.000,006″, the film and coating being intimately adherent the one to the other, characterized in that the film is divided into electrically separate but adjacent areas in electrical connection with the bus bars by ruling an interval extending between the bus bars through the film to the coating under thermal conditions, ensuring a severance of the film restricted to the line of the interval, and constituted by the adjacent film edges exposed at the interval and the coating material below them, the film edges at the interval being less than 1/100 of an inch apart, said interval constituting an electrical insulation between the adjacent film areas and being invisible when observed in the light passing through the glazing.

It is found that narrow intervals, i.e. of less than one-hundredth of an inch thickness which are free from the electro-conductive material are substantially invisible when observed in light passing through the transparent base, and are not sufficiently apparent to be a cause of distraction to an aircraft pilot.

Preferably the narrow intervals are less than 0.006" in width and advantageously are between 0.002" and 0.004" in width.

Figure 2:
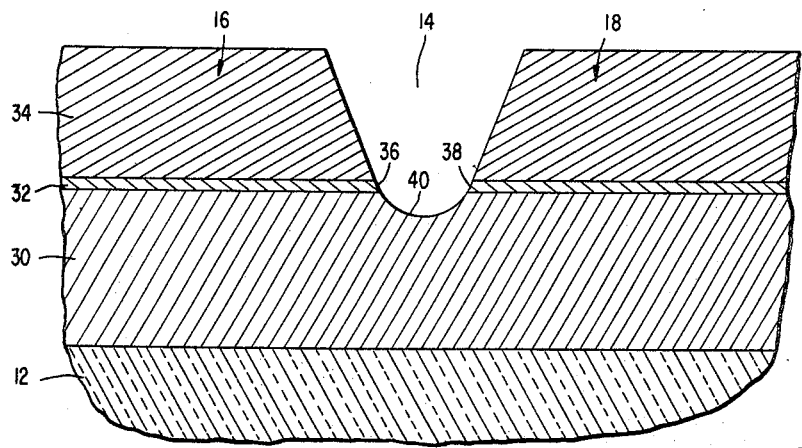

One embodiment of the invention is shown, by way of example, in the accompanying drawings, in which:

FIGURE 1 is a plan view of a glass base having thereon a transparent film which is divided into two areas by a narrow interval, and FIGURE 2 is a greatly enlarged fragmentary sectional view of the glazing and transparent film of FIGURE 1 taken along the lines 2—2 of FIGURE 1.

Referring to FIG. 1, a windscreen or similar assembly 10 is shown therein which comprises a base in the form of a sheet of glass 12 (FIG. 2) provided with a transparent layer, herein more particularly described, which is divided by an interval 14 into separate areas 16 and 18 which are electrically conductive. A common bus bar 20 along one edge of the windscreen is electrically connected to the electrically conductive portions of both areas 16 and 18 while separate bus bars 22 and 24 along the opposite edge of the windscreen are in contact with respective areas 16 and 18. The bus bars 22 and 24 are provided with suitable terminal portions 26 and 28 for connection to an external source of electrical potential so that the areas 16 and 18 are electrically connected in series.

The exact configuration of the windscreeen, the location of the interval 14 and relative proportion of the areas 16 and 18 are of no significance insofar as the present invention is concerned. It will be recognized by those skilled in the art that these factors will depend upon the conditions encountered in a particular situation. A great many intervals could be provided with intervening areas of disparate cross-sectional widths and lengths, all in accord with conventional practice.

The invention herein concerns the arrangement shown in FIG. 2. In this figure, it will be apparent that the base 12 is first provided with an electrically insulating coating 30 on one face thereof. This coating preferably consists of bismuth oxide having a thickness of about $6 \times 10^{-6}$ inches and may be applied by any conventional technique. Applied to and intimately adhered to this coating is a film 32 of gold having a thickness of about $2 \times 10^{-7}$ inches and which may be applied by conventional techniques such as sputtering or thermal evaporation. Lastly, an external or protective coating 34 of bismuth oxide is applied to the film 32, its thickness being about $5 \times 10^{-6}$ inches.

The interval 14 is formed by engaging the tip or point of a heated rod against the surface of the external coating 34 and moving this point at a uniform rate across such surface. Preferably, the rod is tungsten having a diameter of 1/8" ground to a hemispherical point having a radius of about 0.005". The body of the rod is maintained at a temperature of about 700° C. and is traversed at a rate of approximately one inch per second. This will produce an interval 14 substantially as shown in FIG. 2.

As shown, the external coating 34 is completely penetrated and removed along the line of the interval 14 as is the electrically conductive film 32. With the above specified conditions prevailing, the distance between the film edges 36 and 38 is approximately 0.003" and the trough or bottom 40 of the interval 14 penetrates only slightly into the underlying coating 30.

Since not all, but only part, of the total thickness of the several coatings is penetrated along the line of the interval, the boundaries of the interval are capable of variation as would not be the case were the total thickness completely penetrated. This is made possible only because of the underlying coating 30 of electrically insulating material since the conductive film 32 must be penetrated and ruptured in order to provide the electrical discontinuity. Thus the coating 30 serves to elevate the conductive film 32 above the glass surface so that it is accessible for penetration. Moreover, the width of the penetration line can be controlled within smaller limits because of its elevation above the glass surface and the possibility of selective variation of the depth of penetration into the coating 30. Lastly, the presence of the coating 30 protects the glass surface and eliminates the chance of damage thereto as might cause local weakness leading to failure.

The protective external layer 34 also plays a part in controlling the width of the line of penetration through the conductive film 32. By its presence, the rate of feeding the rod across its surface and the temperature of the rod are not so critical as would be the case if the external coating were to be eliminated. If the external coating 32 were eliminated, it will be apparent that it would be difficult to obtain a narrow separation between the edges 36 and 38.

In any event, it is desirable that the depth of penetration be not much more than about 50% of the total thickness of the several coatings.

If the conductive film is of gold, the rod point is maintained at a temperature of about 400° C. to 900° C. Alternatively, however, the conductive film may be of tin oxide, when the point would be at a temperature of about 600° C. to 1200° C. In each case the temperature selected for the point will be related to the speed at which the point is moved across the surface of the glass or other transparent base, e.g. by the aid of a pantograph.

The transparent electro-conductive film is preferably of gold and may be applied to the selected form of glazing as a continuous whole by sputtering or by thermal evaporation to achieve a film of gold 0.000,000,2" thick on a substratum of bismuth oxide 0.000,006" thick and with a protective coating of bismuth oxide 0.000,005" thick. The narrow intervals of high resistivity are formed by ruling lines on the film with a heated point which point penetrates the film and severs it by burning it off or melting it along the lines of contact. The ruled lines may be straight or curved. The heated point may be formed from a 1/8" diameter tungsten rod, the point of which is ground to an approximately spherical shape of 0.005" radius. It may be heated by an insulated coil of Nichrome wire to a temperature of about 700° C. and is traversed across the film at approximately one inch per second. It will be understood that the temperature of the main body of the point or rod is about 700° C., but the temperature of the extreme tip of the point or rod is somewhat lower, probably of the order of 400° C.

By the use of this invention, there is obtained a transparent glazing with an electro-conductive film having one or more highly resistive or substantially non-conductive intervals of very small width of the order of 0.006" or less which by reason of their width are not readily visible and therefore do not form a source of distraction. Furthermore the preferred method according to the invention provides means for producing such intervals without risk of damage to the adjacent films or to the surface of the glass or other transparent base.

What is claimed:

1. The method of making an electrically heated window glazing which includes the steps of covering the surface of the glazing with an inner coating of electrically insulating material, covering said inner coating with a film of electrically conductive material, the thickness of said inner coating being at least about 30 times the thickness of said film, and then dividing said film into discrete adjacent areas by engaging the tip of a heated rod against the external surface of said film and by moving this tip at a uniform rate across said external surface of said film, said tip penetrating through said film along a line between said areas without materially penetrating said inner coating, the linear rate of penetration along said line being maintained to separate the adjacent edges of said areas of said film by an amount not greater than about 0.01 inch.

2. The method of making an electrically heated window glazing which includes the steps of covering a surface of the glazing with an inner coating of electrically insulating material, covering said inner coating with a film of electrically conductive material, the thickness of said inner coating being at least about 30 times the thickness of said film, covering said film with an external coating of electrically insulating material, and then dividing said film into discrete adjacent areas by engaging the tip of a heated rod against the external surface of said external coating and by moving this tip at a uniform rate across said external surface of said external coating, said tip penetrating through said external coating and said film along a line between said areas without materially penetrating said inner coating, the linear rate of penetration along said line being maintained to separate the adjacent edges of said areas of said film by an amount not greater than about 0.01 inch.

References Cited

UNITED STATES PATENTS

| | | | |
|---|---|---|---|
| 2,791,668 | 5/1957 | Cowdrey et al. | 219—543 X |
| 3,119,919 | 1/1964 | Pratt. | |
| 3,180,781 | 4/1965 | Ryan et al. | 219—203 X |
| 3,288,983 | 11/1966 | Lear | 219—203 X |
| 3,302,002 | 1/1967 | Warren | 219—522 X |

JOHN F. CAMPBELL, Primary Examiner

J. L. CLINE, Assistant Examiner

U.S. Cl. X.R.

29—620